(12) United States Patent
Maniwa

(10) Patent No.: US 8,826,767 B2
(45) Date of Patent: Sep. 9, 2014

(54) STEERING APPARATUS

(75) Inventor: Takahiro Maniwa, Gunma-ken (JP)

(73) Assignee: Yamada Manufacturing Co., Ltd., Kiryu-Shi, Gunma-Ken (JP)

( * ) Notice: Subject to any disclaimer, the term of this patent is extended or adjusted under 35 U.S.C. 154(b) by 281 days.

(21) Appl. No.: 13/488,211

(22) Filed: Jun. 4, 2012

(65) Prior Publication Data

US 2012/0312117 A1 Dec. 13, 2012

(30) Foreign Application Priority Data

Jun. 7, 2011 (JP) .................................. 2011-127676

(51) Int. Cl.
*B62D 1/16* (2006.01)
*B62D 1/18* (2006.01)
*B62D 1/184* (2006.01)

(52) U.S. Cl.
CPC ....................................... *B62D 1/184* (2013.01)
USPC ................................ 74/492; 74/493; 280/775

(58) Field of Classification Search
USPC ........... 74/491, 492, 493, 494, 495, 496, 497, 74/567; 280/775, 776, 777, 779
See application file for complete search history.

(56) References Cited

U.S. PATENT DOCUMENTS

| 7,010,996 | B2 * | 3/2006 | Schick et al. .................... 74/492 |
| 7,267,025 | B2 * | 9/2007 | Ko et al. .......................... 74/493 |
| 7,415,908 | B2 * | 8/2008 | Zernickel et al. ............... 74/493 |
| 2004/0035238 | A1 * | 2/2004 | Jolley et al. ..................... 74/493 |

FOREIGN PATENT DOCUMENTS

JP 2004-210265 A 7/2004

* cited by examiner

*Primary Examiner* — Troy Chambers
*Assistant Examiner* — Jake Cook
(74) *Attorney, Agent, or Firm* — McGinn IP Law Group, PLLC

(57) ABSTRACT

A steering apparatus exhibits favorable lever operability and generates a powerful steering column fastening and fixing force during tilt and telescopic adjustment. It has a simple structure includes: a column supporting member; a fixed bracket having, fixed side portions; a lock bolt that penetrates the respective fixed side portions of the fixed bracket together with the column supporting member; a main driving cam; a driven cam; an intermediate cam; and an operating lever. The lock bolt penetrates the main driving cam, the driven cam, and the intermediate cam, the main driving cam is rotated by the operating lever, the driven cam is attached to the fixed side portions to be incapable of rotating, the intermediate cam is disposed between the main driving cam and the driven cam, and the intermediate cam is caused to approach and separate from the main driving cam and the driven cam.

3 Claims, 5 Drawing Sheets

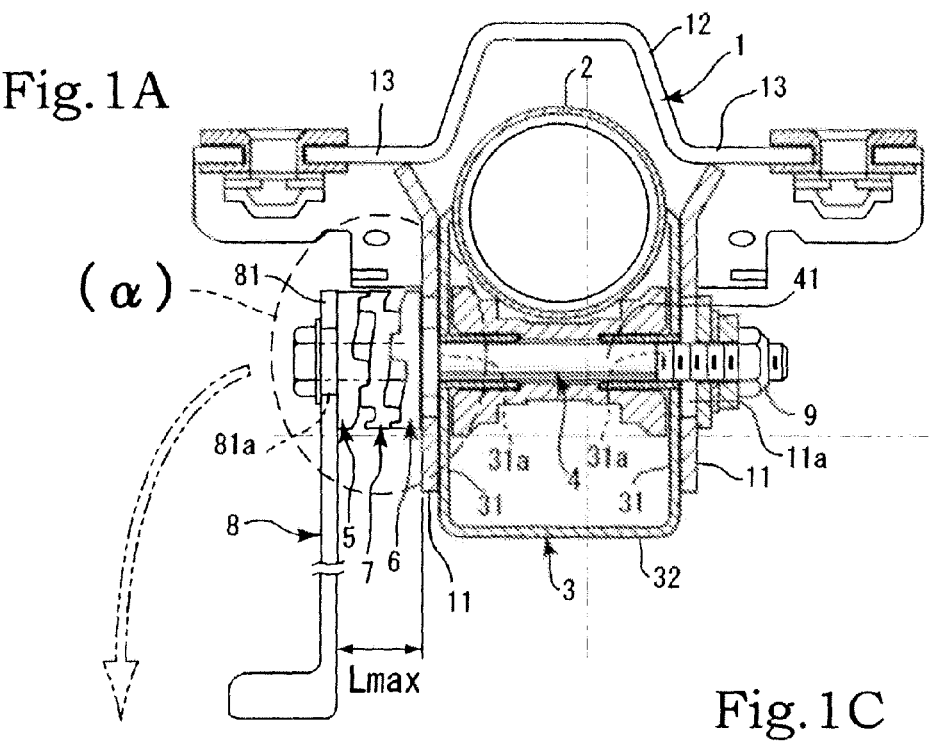
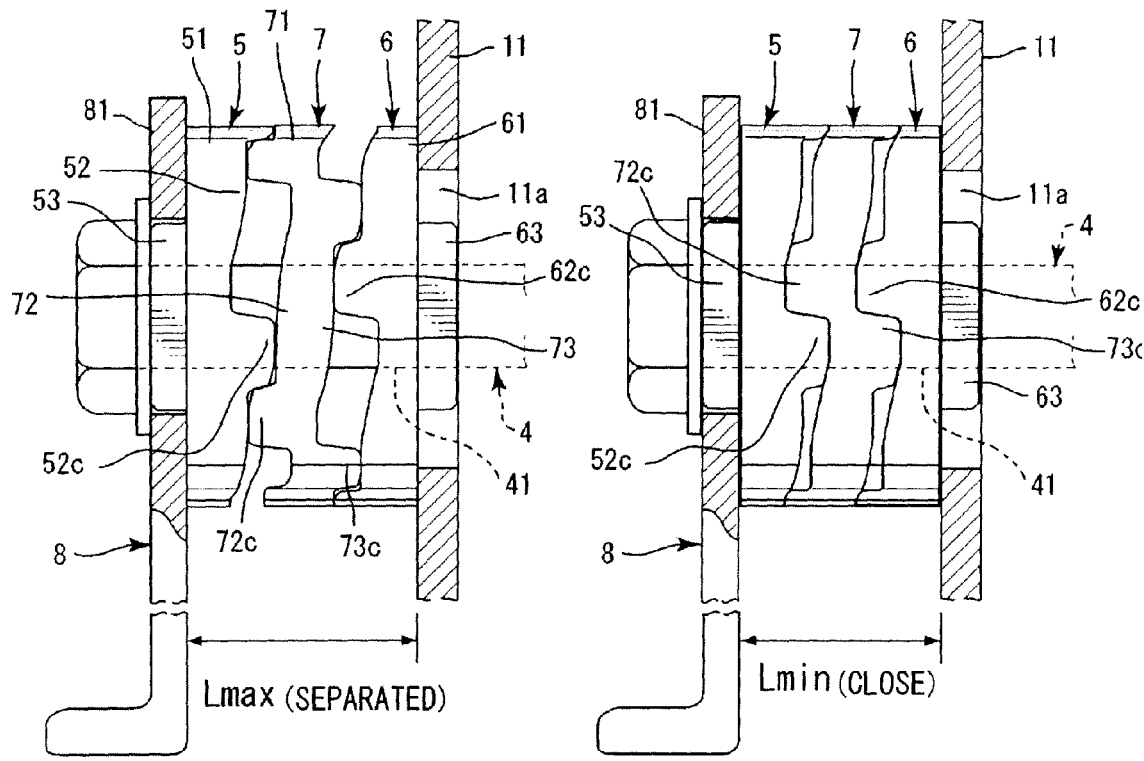

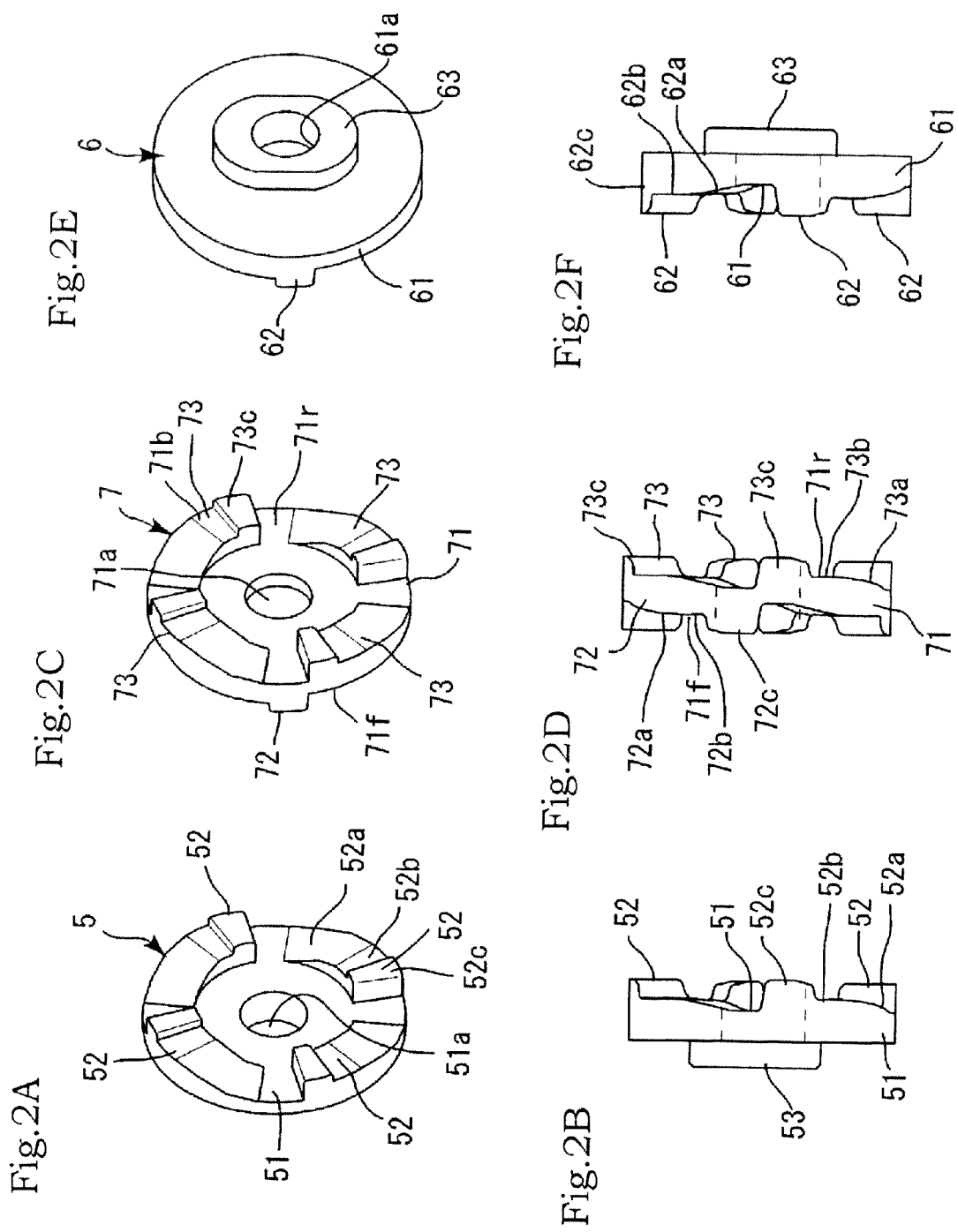

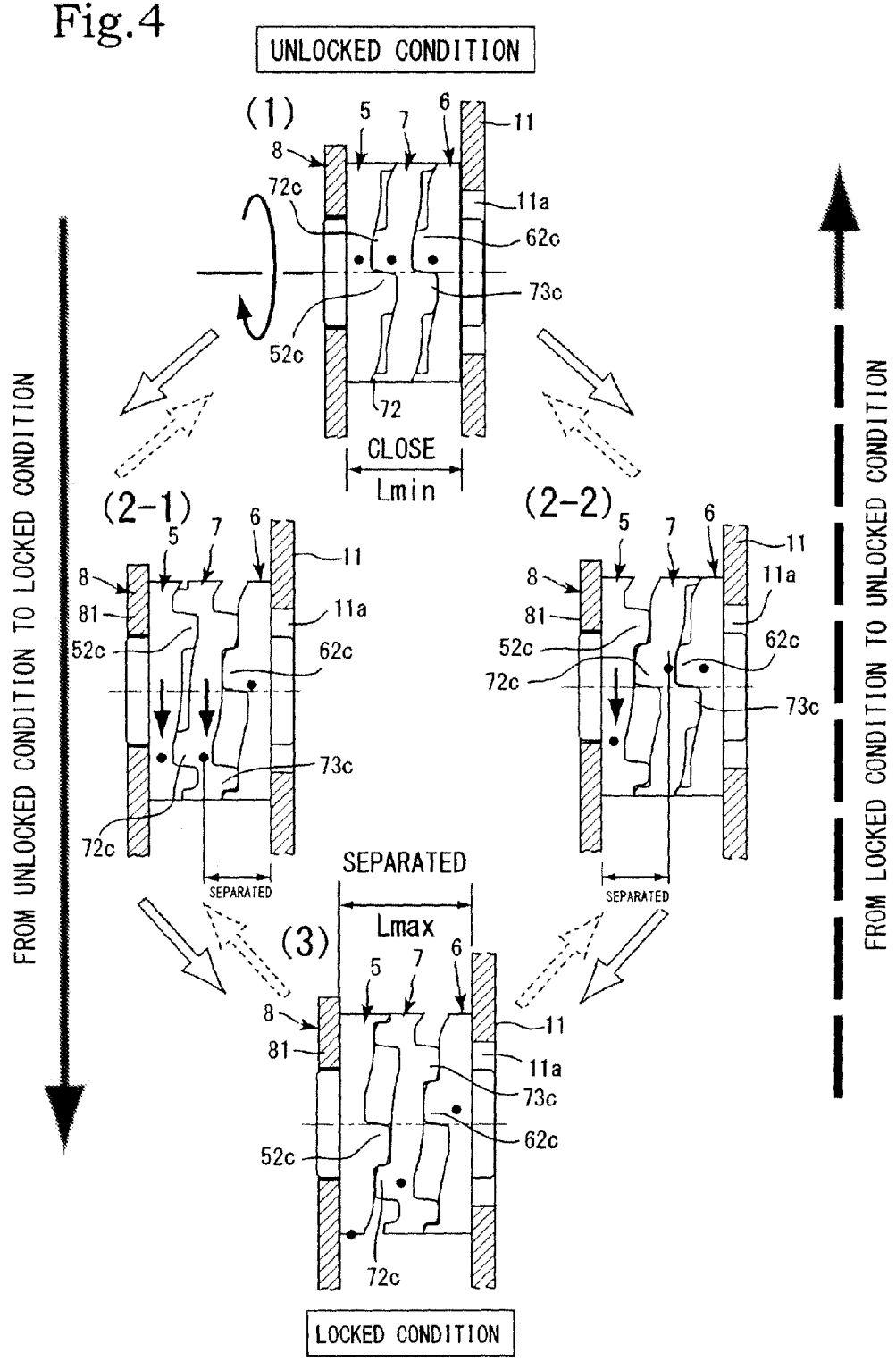

Ha > Hb

SEPARATION La

La > Lb

SEPARTION Lb

STEERING APPARATUS

BACKGROUND OF THE INVENTION

1. Field of the Invention

The present invention relates to a steering apparatus that exhibits favorable lever operability and generates a powerful steering column fastening and fixing force during tilt and telescopic adjustment while having an extremely simple structure.

2. Description of the Related Art

A conventional steering apparatus having a tilt and telescopic adjustment function includes a lock mechanism with which locking is achieved by rotating a spindle that penetrates a side plate of a fixed bracket fixed to a vehicle using an operating lever so as to press the side plate of the fixed bracket. Japanese Patent Application Publication No 2004-210265 is available as this type of steering apparatus.

To summarize the content of Japanese Patent Application Publication No. 2004-210265 (reference symbols provided in the description of Japanese Patent Application Publication No. 2004-210265 are used as is), a connecting rod 50 is inserted into and connected to guide slots 33 serving as tilt adjustment elongated holes formed in fixed brackets 31, 32 and a through hole 43 formed in a movable bracket 40. A first stopper 51 and a second stopper 52 are provided on either end of the connecting rod 50 to prevent the fixed brackets 31, 32 and the movable bracket 40 from separating from each other. Further, a rotary member 70 disposed on the connecting rod 50 to be capable of rotating and conveyance members 81, 82 for fixing and releasing the movable bracket 40 to and from the fixed brackets 31, 32 are provided.

When the rotary member 70 is rotated in one direction, the inside conveyance member 81 and the outside conveyance member 82 move so as to separate to an inner side and an outer side of the rotary member 70, respectively. However, outward movement of the connecting rod 50 is restricted by the stoppers 51, 52, and therefore, during movement of the conveyance members 81, 82, a fixing unit 60 moves in its entirety to the first fixed bracket 31 side by the distance moved by the respective conveyance members 81, 82 so as to press the first fixed bracket 31. As a result, the movable bracket 40 is brought into close contact with the fixed brackets 31, 32 and supported fixedly thereby.

When the rotary member 70 is rotated in an opposite direction, a pressure applied to a tilting portion 84 by a pressing portion 73 is released together with the pressure on the first bracket 31, and therefore the movable bracket 40 is not fixed to the fixed brackets 31, 32 any further.

SUMMARY OF THE INVENTION

In Japanese Patent Application Publication No. 2004-210265, the pressing portions 73 formed on corresponding surfaces on either side of the rotary member 70 pass over the tilting portions 84 formed on the respective conveyance members 81, 82 simultaneously during locking, and therefore tightening a lever 72 may feel heavy, leading to deterioration of an operation feeling. Similarly during unlocking, the pressing portions 73 formed on the corresponding surfaces on either side of the rotary member 70 move over the tilting portions 84 formed on the respective conveyance members 81, 82 simultaneously, and therefore the lever 72 may return too rapidly.

Further, the conveyance member 82 is fixed to the first stopper 51 and therefore, in a case where the connecting rod 50 and the first topper 51 are fastened using a screwing method by rotating the first stopper 51, the conveyance member 82 rotates together with the first stopper 51. Hence, a male screw 50a and a female screw 51a must be formed on the connecting rod 50 and the first stopper 51, respectively, to ensure that a first cam surface 85 of the conveyance member 82 is in alignment with a second cam surface 74 of the rotary member 70 when the connecting rod 50 and the first stopper 51 are fastened. Therefore, initial setting is complicated.

Furthermore, in a case where the connecting rod 50 and the first stopper 51 are fastened using a screwing method by rotating the second stopper 52, it is difficult to fix the rotating second stopper 52 in the guide slot 33 of the fixed bracket 32. Hence, positioning during fastening is difficult in both cases, and therefore a fastening ability is poor. An object of (a technical problem to be solved by) the present invention is to improve the operation feeling of locking and unlocking operations during tilt and telescopic adjustment, and to improve the fastening ability of an apparatus.

As a result of much committed research undertaken by the inventor to solve the problem described above, the problem was solved by providing, as a first aspect of the present invention, a steering apparatus including: a column supporting member for supporting a steering column; a fixed bracket having, on respective width direction sides thereof, fixed side portions that sandwich the column supporting member; a lock bolt that penetrates the respective fixed side portions of the fixed bracket together with the column supporting member; a main driving cam; a driven cam; an intermediate cam; and an operating lever, wherein the lock bolt penetrates the main driving cam, the driven cam, and the intermediate cam in an axial direction, the main driving cam is rotated by the operating lever, the driven cam is attached to the fixed side portions to be incapable of rotating, the intermediate cam is disposed between the main driving cam and the driven cam, and the intermediate cam is caused to approach and separate from the main driving cam and the driven cam in the axial direction by rotating the main driving cam.

Further, the problem described above was solved by providing, as a second aspect of the present invention, the steering apparatus according to the present invention, wherein a separation distance between the main driving cam and the intermediate cam is equal to a separation distance between the driven cam and the intermediate cam. Furthermore, the problem described above was solved by providing, as a third aspect of the present invention, the steering apparatus according to the present invention, wherein a separation distance between the main driving cam and the intermediate cam is different to a separation distance between the driven cam and the intermediate cam.

In the first aspect of the present invention, a lock mechanism is constituted by the main driving cam, the driven cam, and the intermediate cam, and the intermediate cam is provided between the main driving cam and the driven cam. Further, axial direction separation and approach operations between the main driving cam and the intermediate cam and axial direction separation and approach operations between the intermediate cam and the driven cam can be performed in two-stage rotation operations. Due to this two-stage operation, lift amounts generated during separation can be divided into smaller amounts, and therefore an operating load of the operating lever can be reduced during both locking and unlocking. As a result, a favorable operation feeling can be obtained in the operating lever. Further, the operating lever can be prevented from returning too rapidly during unlocking, and therefore an unlocking operation can be performed favorably.

In the second aspect of the present invention, the separation distance between the main driving cam and the intermediate cam is made equal to the separation distance between the driven cam and the intermediate cam. Therefore, the main driving cam and driven cam can be formed with identical shapes and the respective axial direction side faces of the intermediate cam can be formed with identical cam surface shapes, enabling a reduction in manufacturing cost and easy assembly.

In the third aspect of the present invention, the separation distance between the main driving cam and the intermediate cam is made different to the separation distance between the driven cam and the intermediate cam. In so doing, the lift amount can be increased without impairing the operating feeling during locking and unlocking.

BRIEF DESCRIPTION OF THE DRAWINGS

FIG. 1A is a sectional view showing main parts of a steering apparatus in a locked condition, according to the present invention, FIG. 1B is an enlarged view of a part (α) of FIG. 1A, and FIG. 1C is an enlarged view of the part (α) of FIG. 1A in an unlocked condition;

FIG. 2A is a perspective view of main driving cam, FIG. 2B is a side view of the main driving cam, FIG. 2C is a perspective view of an intermediate cam, FIG. 2D is a side view of the intermediate cam, FIG. 2E is a perspective view of a driven cam, and FIG. 2F is a side view of the driven cam;

FIG. 4 is a stroke diagram showing operations for switching the main driving cam, intermediate cam, and driven cam according to the present invention from the unlocked condition to the locked condition and from the locked condition to the unlocked condition.

DESCRIPTION OF THE PREFERRED EMBODIMENTS

Figure 3:
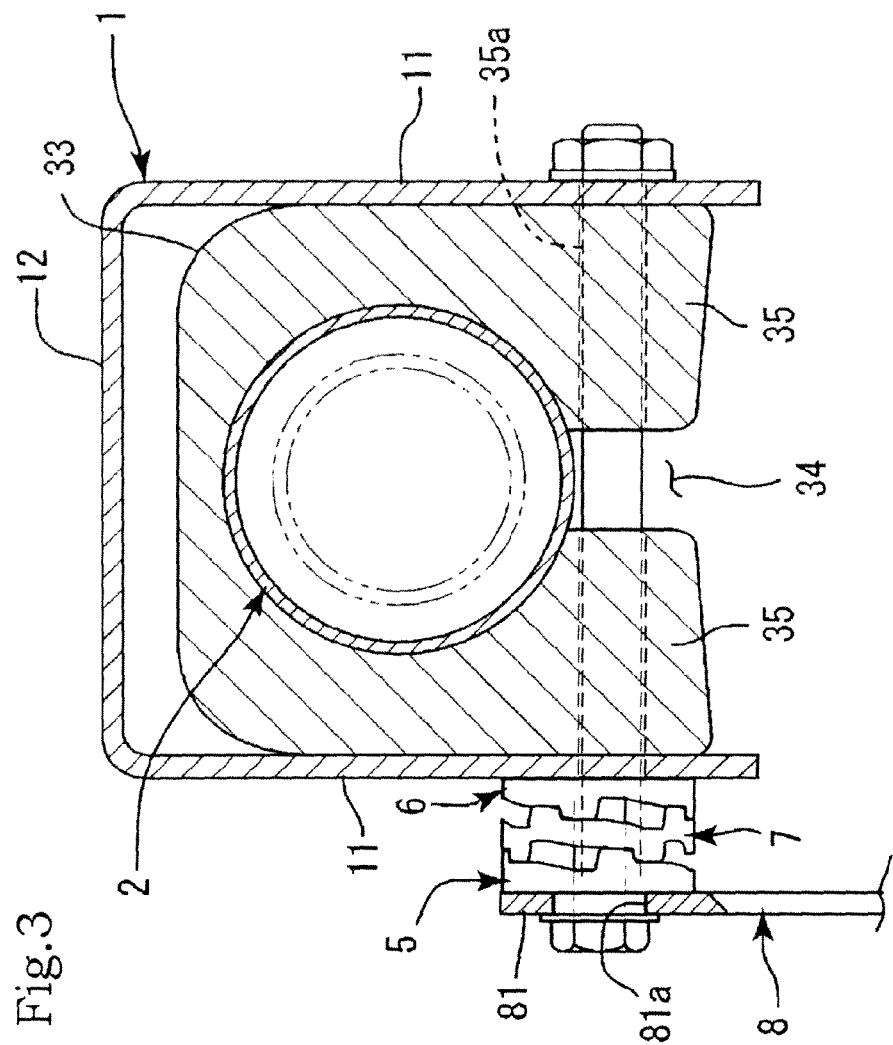
FIG. 3 is an enlarged view showing main parts of an embodiment of the present invention in which a column supporting member is integrated with a steering column.

As shown in FIG. 1A, a steering apparatus according to the present invention is mainly constituted by a fixed bracket 1, a steering column 2, a column supporting member 3, a lock bolt 4, a main driving cam 5, a driven cam 6, an intermediate cam 7, and an operating lever 8. The fixed bracket 1 is mainly constituted by fixed side portions 11, a connecting portion 12, an attachment portion 13, and so on. The two fixed side portions 11 are substantially flat plate-shaped sites that oppose each other in parallel. Tilt adjustment elongated holes 11a are formed in the two fixed side portions 11 in a substantially vertical direction to serve as sites penetrated by the lock bolt 4, as will be described below.

The two fixed side portions 11 are connected by the connecting portion 12 in an upper portion location thereof using welding means or the like. The connecting portion 12 is formed in a substantially trapezoidal gate shape, an arch shape, or the like when viewed from the front. Further, the horizontally shaped attachment portions 13 are formed to face outward from an upper end location of the two fixed side portions 11. The fixed bracket 1 is fixed to a frame member or the like on a front portion of a traveling vehicle such as an automobile via the attachment portions 13.

The steering column 2 is constituted by an outer column 21 and an inner column 22, and a steering shaft is housed in the interior of the inner column 22 to be free to rotate in a periaxial direction. The outer column 21 is supported either fixedly or to be capable of moving in an axial direction by the column supporting member 3. The column supporting member 3 exists in a plurality of types. A first type is a movable bracket having movable side portions 31 on either width direction side, wherein the two movable side portions 31 are connected by a connecting portion 32 so as to be formed integrally. Telescopic adjustment elongated holes 31a are formed in the movable side portions 31. Further, the outer column 21 is fixed to respective upper end edges of the two movable side portions 31.

The two movable side portions 31 of the movable bracket are disposed between the two fixed side portions 11 of the fixed bracket 1. The lock bolt 4 is inserted into the tilt adjustment elongated holes 11a and the telescopic adjustment elongated holes 31a, whereby the movable bracket type column supporting member 3 and the steering column 2 are connected to the fixed bracket 1 to be capable of tilt and telescopic adjustment (see FIG. 1A).

A second type of the column supporting member 3 is formed integrally with the outer column 21 and fixed to the fixed bracket 1 while clutching the inner column 22. This column supporting member 3 is formed mainly from an aluminum alloy and so on by casting, extrusion molding, or the like, and is mainly constituted by a clutching main body portion 33 and two fastening pieces 35 (see FIG. 3). The clutching main body portion 33 is formed in a substantially cylindrical shape, and a clutching inner peripheral surface thereof is formed in a substantially hollow cylindrical shape so as to clutch the inner column 22. A dividing groove portion 34 is formed on a diametrical direction lower portion side of the clutching main body portion 33, and the two fastening pieces 35 are formed in locations on respective width direction sides of the dividing groove portion 34.

The two fastening pieces 35 are formed to oppose each other in an orthogonal direction to an axial direction of the inner column 22 and in a width direction of the clutching main body portion 33, and fastening holes 35a are formed respectively in the two fastening pieces 35. The lock bolt 4 is inserted into the two fastening holes 35a and the tilt adjustment elongated holes 11a in the two fixed side portions 11 of the fixed bracket 1 such that the fixed bracket 1 and the column supporting member 3 formed integrally with the outer column 21 are connected to be capable of tilt and telescopic adjustment.

Next, the main driving cam 5, the driven cam 6, and the intermediate cam 7 will be described. A plurality of embodiments exists with regard to the constitutions of the cams. In a first embodiment, the main driving cam 5 is formed from a cam base portion 51 and a plurality of cam operating portions 52 (see FIG. 1 and FIGS. 2A and 2B). The cam base portion 51 is formed substantially in a disc shape, and an attachment hole 51a is formed in a center of the cam base portion 51.

The attachment hole 51a is press-fitted to a press-fitting region of the lock bolt 4 such that the main driving cam 5 is capable of rotating in a periaxial direction of the lock bolt 4 together therewith. The plurality of cam operating portions 52 are formed in a circumferential direction in an appropriate region on an outer periphery of one side face of the cam base portion 51 (see FIGS. 2A and 2B).

An inclined surface 52a, a top surface 52b, and a cam projecting portion 52c are formed continuously in each cam operating portion 52. The inclined surface 52a is formed as an inclined surface that retreats gradually from a surface of the cam base portion 51, and the flat surface-shaped top surface 52b is formed on an apex of the inclined surface 52a. Further, the cam projecting portion 52c is formed on a circumferential direction outer side of the inclined surface 52b. The cam projecting portion 52c is formed to have a substantially rectangular shape when a peripheral side face thereof is seen from the outside. The plurality of cam operating portions 52 in which these components form a single set are formed at equal intervals around the outer periphery of the cam base portion 51.

More specifically, the outer periphery of the cam base portion 51 is divided into four equal parts, and a single cam operating portion 52 is formed in each of four divided regions obtained as a result. With this configuration, four cam operating portions 52 are formed on the single cam base portion 51 (see FIGS. 2A and 2B). The number of cam operating portions 52 is not necessarily limited to four, and three or less or five or more portions may be provided instead. A non-circular bulging portion 53 is formed concentrically with the center of the cam base portion 51 on an opposite side face of the cam base portion 51 to the side on which the cam operating portions 52 are formed (see FIG. 2B). The bulging portion 53 is formed in an elongated circular shape, a rectangular shape, an elliptical shape, a circular shape partially formed in a flat surface shape, or the like. The bulging portion 53 is attached by being inserted into a fixing hole 81a provided in a rocking central portion 81 of the operating lever 8, whereby the operating lever 8 and the main driving cam 5 rotate integrally.

The driven cam 6 is formed in an identical shape to the main driving cam 5. The driven cam 6 is formed from a cam base portion 61 and a plurality of cam operating portions 62 (see FIG. 1 and FIGS. 2E and 2F). An inclined surface 62a, a top surface 62b, and a cam projecting portion 62c are formed continuously in each cam operating portion 62. An attachment hole 61a is formed in a center of the cam base portion 61. The attachment hole 61a is attached to a bolt shaft portion 41 of the lock bolt 4 to be capable of spinning.

A non-circular bulging portion 63 is formed concentrically with the center of the cam base portion 61 on an opposite side face of the cam base portion 61 to the side on which the cam operating portions 62 are formed. The bulging portion 63 has a substantially identical shape to the bulging portion 53 of the main driving cam 5. The bulging portion 63 of the driven cam 6 is disposed in the tilt adjustment elongated hole 11a formed in the fixed bracket 1 such that the driven cam 6 is incapable of rotating.

The intermediate cam 7 is disposed between the main driving cam 5 and the driven cam 6 in the axial direction of the lock bolt 4 (see FIG. 1 and FIGS. 2C and 2D). The intermediate cam 7 is formed from a cam base portion 71, main cam operating portions 72, and driven cam operating portions 73. An attachment hole 71a that is penetrated by the lock bolt 4 is formed in a diametrical center of the cam base portion 71. A main base surface 71f and a driven base surface 71r exist on respective axial direction side faces of the cam base portion 71 such that the main base surface 71f opposes a cam surface of the main driving cam 5 and the driven base surface 71r opposes a cam surface of the driven cam 6.

The main cam operating portions 72 are formed on the main base surface 71f, and the driven cam operating portions 73 are formed on the driven base surface 71r. The main cam operating portion 72 is constituted by an inclined surface 72a, a top surface 72b, and a cam projecting portion 72c. The driven cam operating portion 73 is similarly constituted by an inclined surface 73a, a top surface 73b, and a cam projecting portion 73c. The main cam operating portion 72 and the driven cam operating portion 73 are formed in an identical shape.

The main driving cam 5, the driven cam 6, and the intermediate cam 7 are disposed on an outer side of the fixed side portion 11 on one side of the fixed bracket 1 via the lock bolt 4 and arranged in order of the driven cam 6, the intermediate cam 7, and the main driving cam 5 from the fixed side portion 11. The operating lever 8 is disposed on one axial direction end side of the lock bolt 4, and the lock bolt 4 is attached to the fixed bracket 1 on the other axial direction end side by a fastening tool 9 such as a nut or a washer.

Further, the main driving cam 5 rotates together with the operating lever 8, whereas the driven cam 6 is attached to the tilt adjustment elongated hole 11a in the fixed side portion 11 to be incapable of rotating. The intermediate cam 7 is free to spin relative to the lock bolt 4. Hence, according to the present invention, the main driving cam 5 and the intermediate cam 7 separate from and approach each other through relative rotation, and the intermediate cam 7 and the driven cam 6 separate from and approach each other through relative rotation.

When the main driving cam 5 and the intermediate cam 7 are close and the intermediate cam 7 and the driven cam 6 are close, an axial direction interval between the main driving cam 5 and the driven cam 6 reaches a minimum interval Lmin (see FIG. 1C). This condition corresponds to an unlocked condition during tilt and telescopic adjustment. Further, when the main driving cam 5 and the intermediate cam 7 are separated and the intermediate cam 7 and the driven cam 6 are separated, the axial direction interval between the main driving cam 5 and the driven cam 6 reaches a maximum interval Lmax (see FIG. 1B). This condition corresponds to a locked condition during tilt and telescopic adjustment.

Next, fastening and fixing according to the present invention will be described on the basis of FIG. 4. First, during a locking operation, the operating lever 8 is rotated downward, or in other words clockwise, such that the lock bolt 4 rotates together with the main driving cam 5 (see (1) in FIG. 4). Note that black dots in FIG. 4 indicate respective positions of the main driving cam 5, the driven cam 6, and the intermediate cam 7, and displacement of the positions of the black dots indicates that the main driving cam 5 and the intermediate cam 7 have rotated by a predetermined amount in directions indicated by arrows. The driven cam 6 is incapable of rotating relative to the fixed side portion 11. Therefore, in a first stage, the main driving cam 5 and the intermediate cam 7 rotate simultaneously in a clockwise direction relative to the unrotatable driven cam 6.

The driven cam operating portions 73 of the intermediate cam 7 rotating together with the main driving cam 5 accordingly move away from the cam operating portions 62 of the unrotatable driven cam 6 such that an axial direction separation interval is generated between the intermediate cam 7 and the driven cam 6. In other words, a stroke is performed from (1) to (2-1) in FIG. 4. The cam projecting portions 73c of the rotating intermediate cam 7 and the cam projecting portions 62c of the unrotatable driven cam 6 then come into contact with each other in a cam axial rotation direction (a circumferential direction). As a result, the rotation of the intermediate cam 7 is stopped by the driven cam 6 such that the separation interval between the intermediate cam 7 and the driven cam 6 reaches a maximum.

When the operating lever 8 continues to be operated as is after the rotation of the intermediate cam 7 has been stopped in the manner described above, the main driving cam 5 rotates clockwise relative to the stopped intermediate cam 7 in a second stage. In other words, a stroke is performed from (2-1)

to (3) in FIG. 4. During this stoke, the main cam operating portions 72 of the stopped intermediate cam 7 and the cam operating portions 52 of the rotating main driving cam 5 move relative to each other. More specifically, the cam operating portions 52 of the main driving cam 5 move in the axial direction away from the main cam operating portions 72 of the intermediate cam 7 such that a separation interval is generated in the axial direction between the intermediate cam 7 and the main driving cam 5.

The cam projecting portions 72c of the intermediate cam 7 and the cam projecting portions 52c of the main driving cam 5 then come into contact with each other in the cam axial rotation direction (the circumferential direction). As a result, the rotation of the main driving cam 5 relative to the intermediate cam 7 is stopped such that the separation interval between the main driving cam 5 and the intermediate cam 7 reaches a maximum. Thus, a total axial direction interval between the main driving cam 5, the intermediate cam 7, and the driven cam 6 reaches a maximum, and as a result, the fixed bracket 1 and the steering column 2 are locked during tilt and telescopic adjustment (see (3) in FIG. 4).

Next, a second fastening and fixing pattern according to the present invention will be described. When the operating lever 8 is rotated downward, or in other words clockwise, the lock bolt 4 rotates together with the main driving cam 5. Here, similarly to the first pattern, the driven cam 6 is incapable of rotating. Hence, in a first stage, the main driving cam 5 rotates in the clockwise direction alone relative to the intermediate cam 7 and the driven cam 6. The intermediate cam 7 does not rotate, and the driven cam 6 is incapable of rotating.

As a result, first, the cam operating portions 52 of the initially rotating main driving cam 5 move in the axial direction away from the main cam operating portions 72 of the stopped intermediate cam 7 such that the main driving cam 5 and the intermediate cam 7 separate from each other. In other words, condition (1) shifts to condition (2-2) in FIG. 4. The cam projecting portions 52c of the rotating main driving cam 5 and the cam projecting portions 72c of the non-rotating intermediate cam 7 then come into contact with each other in the cam axial rotation direction (or the circumferential direction). As a result, the separation interval between the main driving cam 5 and the intermediate cam 7 reaches a maximum such that the intermediate cam 7 is rotated by the rotation of the main driving cam 5. When the operating lever 8 continues to be rotated as is, the main driving cam 5 and the intermediate cam 7 begin to rotate relative to the unrotatable driven cam 6 simultaneously in a second stage.

The driven cam operating portions 73 of the intermediate cam 7 rotating together with the main driving cam 5 then move relative to the cam operating portions 62 of the unrotatable driven cam 6. Accordingly, the cam projecting portions 72c of the rotating intermediate cam 7 and the cam projecting portions 62c of the driven cam 6 come into contact with each other in the cam axial rotation direction (or the circumferential direction). As a result, the rotation of the main driving cam 5 and the intermediate cam 7 is stopped by the unrotatable driven cam 6 such that the respective separation intervals between the main driving cam 5, the intermediate cam 7, and the driven cam 6 reach the maximum intervals, whereby the locked condition is established. In other words, condition (2-2) shifts to condition (3) in FIG. 4. Thus, the total axial direction interval between the main driving cam 5, the intermediate cam 7, and the driven cam 6 reaches a maximum, and as a result, the fixed bracket 1 and the steering column 2 are locked during tilt and telescopic adjustment.

Next, unlocking will be described. When the operating lever 8 is rotated upward, or in other words counter-clockwise, the lock bolt 4 rotates together with the main driving cam 5, whereby the main driving cam 5 and the intermediate cam 7 rotate counter-clockwise simultaneously relative to the unrotatable driven cam 6 in a first stage. In other words, condition (3) shifts to condition (2-2) in FIG. 4. Accordingly, the driven cam operating portions 73 of the rotating intermediate cam 7 move relative to the cam operating portions 62 of the driven cam 6.

The cam projecting portions 73c of the rotating intermediate cam 7 and the cam projecting portions 62c of the unrotatable driven cam 6 then approach each other so as to come into contact in the cam axial rotation direction (or the circumferential direction). As a result, the rotation of the intermediate cam 7 is stopped by the driven cam 6. Then, in a second stage, the main driving cam 5 rotates counter-clockwise relative to the stopped intermediate cam 7.

The cam operating portions 52 of the rotating main driving cam 5 thus move relative to the main cam operating portions 72 of the stopped intermediate cam 7 in an approaching direction, whereby the cam projecting portions 72c of the intermediate cam 7 and the cam projecting portions 52c of the main driving cam 5 come into contact with each other in the cam axial rotation direction (or the circumferential direction). As a result, the rotation of the main driving cam 5 is stopped by the intermediate cam 7 such that the total axial direction interval between the main driving cam 5, the intermediate cam 7, and the driven cam 6 reaches a minimum, whereby the unlocked condition is established. In other words, condition (2-2) shifts to condition (1) in FIG. 4.

Next, a second unlocking pattern will be described. When the operating lever 8 is rotated upward, or in other words counter-clockwise, the lock bolt 4 rotates together with the main driving cam 5. In a first stage, the main driving cam 5 rotates counter-clockwise alone relative to the intermediate cam 7 and the unrotatable driven cam 6. The intermediate cam 7 does not rotate, and the driven cam 6 is incapable of rotating. In other words, condition (3) shifts to condition (2-1) in FIG. 4. The cam operating portions 52 of the rotating main driving cam 5 move relative to the main cam operating portions 72 of the stopped intermediate cam 7. Accordingly, the cam projecting portions 52c of the rotating main driving cam 5 and the cam projecting portions 72c of the non-rotating intermediate cam 7 come into contact with each other in the cam axial rotation direction (or the circumferential direction). As a result, the separation interval between the main driving cam 5 and the intermediate cam 7 reaches a minimum such that the intermediate cam 7 is rotated by the rotation of the main driving cam 5.

When the operating lever 8 continues to be rotated as is, the main driving cam 5 and the intermediate cam 7 rotate counter-clockwise simultaneously relative to the unrotatable driven cam 6 in a second stage. Accordingly, the driven cam operating portions 73 of the intermediate cam 7 move relative to the cam operating portions 62 of the driven cam 6. The cam projecting portions 73c of the intermediate cam 7 and the cam projecting portions 62c of the driven cam 6 thus come into contact with each other in the cam axial rotation direction (or the circumferential direction). As a result, the rotation of the main driving cam 5 and the intermediate cam 7 is stopped by the unrotatable driven cam 6 such that the overall axial direction interval between the main driving cam 5, the intermediate cam 7, and the driven cam 6 reaches a minimum, whereby the unlocked condition is established. In other words, condition (2-1) shifts to condition (1) in FIG. 4.

Hence, during locking and unlocking according to the present invention, the main driving cam 5, the driven cam 6, and the intermediate cam 7 are rotated in two stages. During locking, the cam projecting portions 72c, 73c formed respectively on the main base surface 71f and the driven base surface 71r on either axial direction side face of the intermediate cam 7 move in two stages rather than climbing the inclined surface 51 of the main driving cam 5 and the inclined surface 71 of the driven cam 6 simultaneously. As a result, an operating load of the operating lever 8 can be reduced such that a favorable operation feeling can be obtained in the operating lever 8. Furthermore, the steering column 2 can be fastened and fixed rigidly without the need for an increase in cam size.

During unlocking, the cam projecting portions 72c, 73c formed on the respective side faces of the intermediate cam 7 descend in two stages rather than descending the inclined surface 52a of the main driving cam 5 and the inclined surface 62a of the driven cam 6 simultaneously, and therefore an initial operation of the operating lever 8 during unlocking does not feel heavy. Hence, a favorable operation feeling can be obtained in the operating lever 8. Furthermore, by dividing the descending movement into two stages, the operating lever 8 can be prevented from returning too rapidly.

In the first embodiment of the present invention, described above, the cam operating portions 52 of the main driving cam 5 are shaped identically to the cam operating portions 62 of the driven cam 6, and the main cam operating portions 72 and driven cam operating portions 73 of the intermediate cam 7 are likewise shaped identically to the cam operating portions 52 and cam operating portions 62. In other words, a separation distance between the intermediate cam 7 and the main driving cam 5 is identical to a separation distance between the intermediate cam 7 and the driven cam 6.

In a second embodiment, on the other hand, the cam operating portions 52 of the main driving cam 5 are shaped differently to the cam operating portions 62 of the driven cam 6 such that the separation distance between the main driving cam 5 and the intermediate cam 7 is different to the separation distance between the driven cam 6 and the intermediate cam 7. In this embodiment, a height Ha from the cam surface of the cam base portion 51 of the main driving cam 5 to the top surface 52b of the cam operating portion 52 is different to a height Hb from the cam surface of the cam base portion 61 of the driven cam 6 to the top surface 62b of the cam operating portion 62.

Figure 5A:
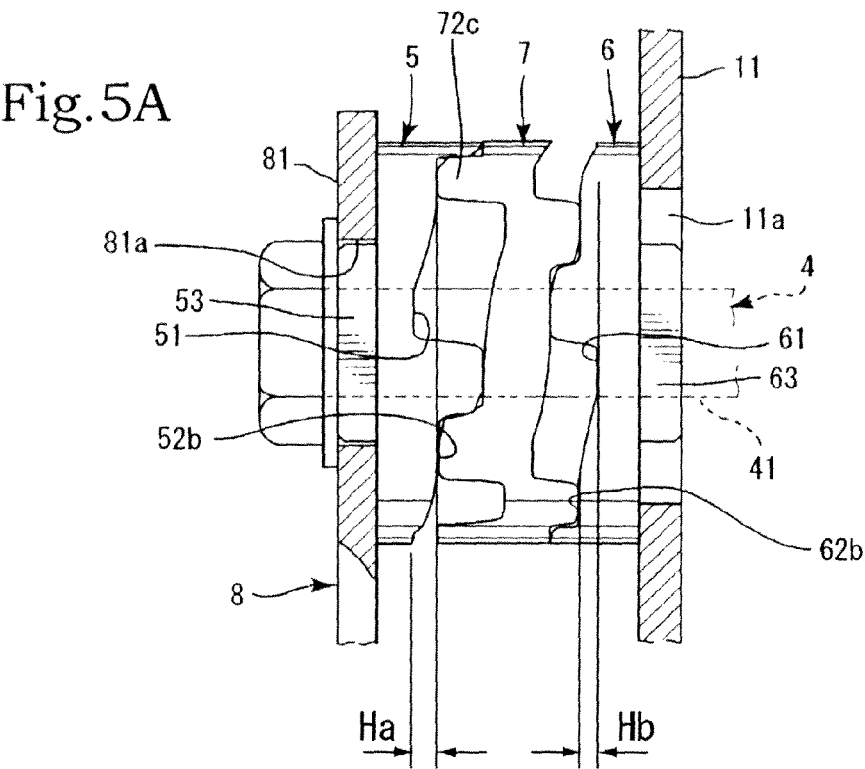
FIG. 5A is an enlarged view showing main parts of a second embodiment of the present invention.
Figure 5B:
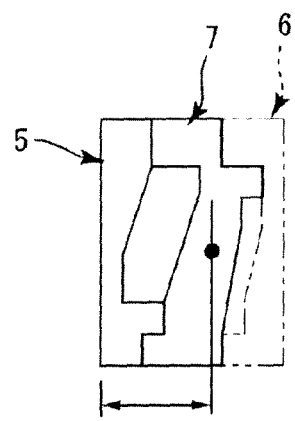
FIG. 5B is a schematic view showing a main driving cam and an intermediate cam according to the second embodiment in a separated condition.
Figure 5C:
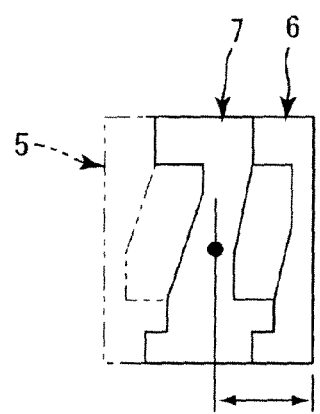
FIG. 5C is a schematic view showing the intermediate cam and a driven cam according to the second embodiment in a separated condition.

In an embodiment shown in FIG. 5, the height Ha from the cam surface to the top surface 52b of the cam operating portion 52 is greater than the height Hb from the cam surface of the cam base portion 61 of the driven cam 6 to the top surface 62b of the cam operating portion 62, and therefore Ha>Hb. Accordingly, a separation distance La between the main driving cam 5 and the intermediate cam 7 is set to be larger than a separation distance Lb between the intermediate cam 7 and the driven cam 6. An opposite configuration may also be employed.

The main cam operating portions 72 and the driven cam operating portions 73 of the intermediate cam 7 are formed identically to the main cam operating portions 72 of the main driving cam 5 and the driven cam operating portions 73 of the driven cam 6, respectively. For example, the separation distance between the main driving cam 5 and the intermediate cam 7 is formed to be larger than the separation distance between the driven cam 6 and the intermediate cam 7.

Hence, even when the respective cam operating portions of the main driving cam 5, the driven cam 6, and the intermediate cam 7 do not have identical shapes, the lever operability is not impaired as long as rotation is performed in two stages. Therefore, the respective cam operating portions of the main driving cam 5, the driven cam 6, and the intermediate cam 7 may be formed in several variations such that a lift amount can be increased without increasing the size of the lock mechanism.

Further, in the embodiments described above, the main driving cam 5, the driven cam 6, and the intermediate cam 7 are all formed with identical diameters. In so doing, component uniformity can be realized, making manufacture of the cams easy. However, the main driving cam 5, the driven cam 6, and the intermediate cam 7 may have different diameters. For example, the driven cam 6 and the main driving cam 5 may have identical diameters while the diameter of the intermediate cam 7 alone is different, or the main driving cam 5, the driven cam 6, and the intermediate cam 7 may all have different diameters to each other. According to the present invention, various modifications and amendments may be implemented appropriately on the embodiments described above.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A steering apparatus comprising:
   a column supporting member for supporting a steering column;
   a fixed bracket having, on respective width direction sides thereof, fixed side portions that sandwich said column supporting member;
   a lock bolt that penetrates said respective fixed side portions of said fixed bracket together with said column supporting member;
   a main driving cam;
   a driven cam;
   an intermediate cam; and
   an operating lever, wherein
   said lock bolt penetrates said main driving cam, said driven cam, and said intermediate cam in an axial direction,
   said main driving cam is rotated by said operating lever,
   said driven cam is attached to said fixed side portions to be incapable of rotating,
   said intermediate cam is disposed between said main driving cam and said driven cam, and
   said intermediate cam is caused to approach and separate from said main driving cam and said driven cam in said axial direction by rotating said main driving cam.

2. The steering apparatus according to claim 1, wherein a separation distance between said main driving cam and said intermediate cam is equal to a separation distance between said driven cam and said intermediate cam.

3. The steering apparatus according to claim 1, wherein a separation distance between said main driving cam and said intermediate cam is different from a separation distance between said driven cam and said intermediate cam.

* * * * *